US007099858B2

(12) United States Patent
Aldrich et al.

(10) Patent No.: US 7,099,858 B2
(45) Date of Patent: Aug. 29, 2006

(54) DATA MANAGEMENT SYSTEM THAT PROVIDES INTELLIGENT ACCESS PLAN CACHING

(75) Inventors: Craig Stephen Aldrich, Rochester, MN (US); Mark John Anderson, Oronoco, MN (US); Lynnette Elaine Carston, Rochester, MN (US); Brian Robert Muras, Rochester, MN (US); Thomas James Schreiber, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 10/354,802

(22) Filed: Jan. 30, 2003

(65) Prior Publication Data
US 2004/0153454 A1   Aug. 5, 2004

(51) Int. Cl.
*G06F 17/30* (2006.01)
*G06F 7/00* (2006.01)

(52) U.S. Cl. .................................. 707/2; 707/4; 707/5
(58) Field of Classification Search ................. 707/102, 707/2, 4, 5
See application file for complete search history.

(56) References Cited

U.S. PATENT DOCUMENTS

| 6,721,724 B1* | 4/2004 | Galindo-Legaria et al. .... 707/2 |
| 6,847,978 B1* | 1/2005 | Ellis et al. ................... 707/102 |
| 6,985,904 B1* | 1/2006 | Kaluskar et al. ............ 707/101 |
| 2004/0243555 A1* | 12/2004 | Bolsius et al. ................. 707/3 |

OTHER PUBLICATIONS http://msdn.microsoft.com/library/en-us/architec/8_ar_sa_4azp.asp?frame=true, "Execution Plan Caching and Reuse," printed Jan. 27, 2003.

\* cited by examiner

*Primary Examiner*—Don Wong
*Assistant Examiner*—Thanh-Ha Dang
(74) *Attorney, Agent, or Firm*—Steven W. Roth; Roy W. Truelson

(57) ABSTRACT

Disclosed is an apparatus, method, and program product for performing efficient database access plan caching. Unlike prior art mechanism that automatically discard stored access plans whenever the need for a different access plans is detected, stored plans are intelligently retained despite the handling of one or more infrequent queries that call for the use of a different plan.

9 Claims, 3 Drawing Sheets

DATA MANAGEMENT SYSTEM THAT PROVIDES INTELLIGENT ACCESS PLAN CACHING

FIELD OF THE INVENTION

The present invention relates to Data Management Systems, and in particular, to access plan storage management.

BACKGROUND OF THE INVENTION

Fundamentally speaking, today's computer systems are primarily used for storage, manipulation, and analysis of information. This information, called data, can be anything from complicated financial information to simple baking recipes. It is no surprise, then, that the overall value, or worth, of a computer system depends largely upon how well the computer system stores, manipulates, and analyzes data. This patent pertains to the mechanism used on a computer system to perform these functions. This mechanism is formally referred to herein as a Data Management System, although the terms "database system," "database," and Data Management System (DMS) are used interchangeably throughout this patent.

At the most basic level, the data of a database is stored as a series of logical tables. Each table is made up of rows and columns. Each table has a unique name within the database and each column has a unique name within the particular table. Different statements, called queries, allow the user to obtain data from the database. As one might imagine, queries range from being very simple to very complex. When a database receives a query, the database interprets the query and determines what internal steps are necessary to satisfy the query. These internal steps may include identification of the table or tables specified in the query, the row or rows selected in the query, and other information such as the order in which the tables were joined together to satisfy the query. When taken together, these internal steps are referred to as an execution, or access, plan. When an access plan is created for a given query it is often saved by the DMS. Then, when the user repeats the query, as users often do, the database can reutilize the saved access plan instead of undergoing the expensive process of recreating it from scratch.

As an advanced property, current databases are also capable of discarding saved access plans when it is sensible to do so. One example, might be the deletion of old, unused access plans. Another more complicated example involves the notion of "data skew." As used here, data skew refers to significant, non-uniform data distribution. For instance, consider a customer table having customer names organized in alphabetic order. If the table includes a few names that begin with each letter of the alphabet, the table would be said to contain more or less uniform data. However, if for some reason the table also included one hundred names starting with the letter "S," the table would be said to contain skewed data. Data skew is important to recognize because a different access plan will almost certainly be needed to best handle the query when data skew is involved. Thus, when data skew is encountered, certain systems often discard an access plan stored for a particular query and recreate the access plan so as to best handle the skewed case. The newly created access plan is then stored for reuse.

While this approach is efficient in the handling of situations involving data skew, it can end up being inefficient overall because an otherwise valid access plan can be discarded to accommodate an infrequent situation (i.e., data skew). Without a Data Management System that can provide intelligent access plan caching in an environment where data skew is present, database performance will continue to be constrained by less sophisticated access plan caching strategies.

SUMMARY OF THE INVENTION

The present invention involves an apparatus, method, and program product for performing enhanced access plan caching through intelligent consideration of past behavior in light of data distribution abnormalities, such as data skew.

The preferred embodiment of the present invention accomplishes this intelligent access plan caching by considering the extent to which an access plan had been reused prior to encountering data skew.

DESCRIPTION OF THE PREFERRED EMBODIMENT

Figure 1:
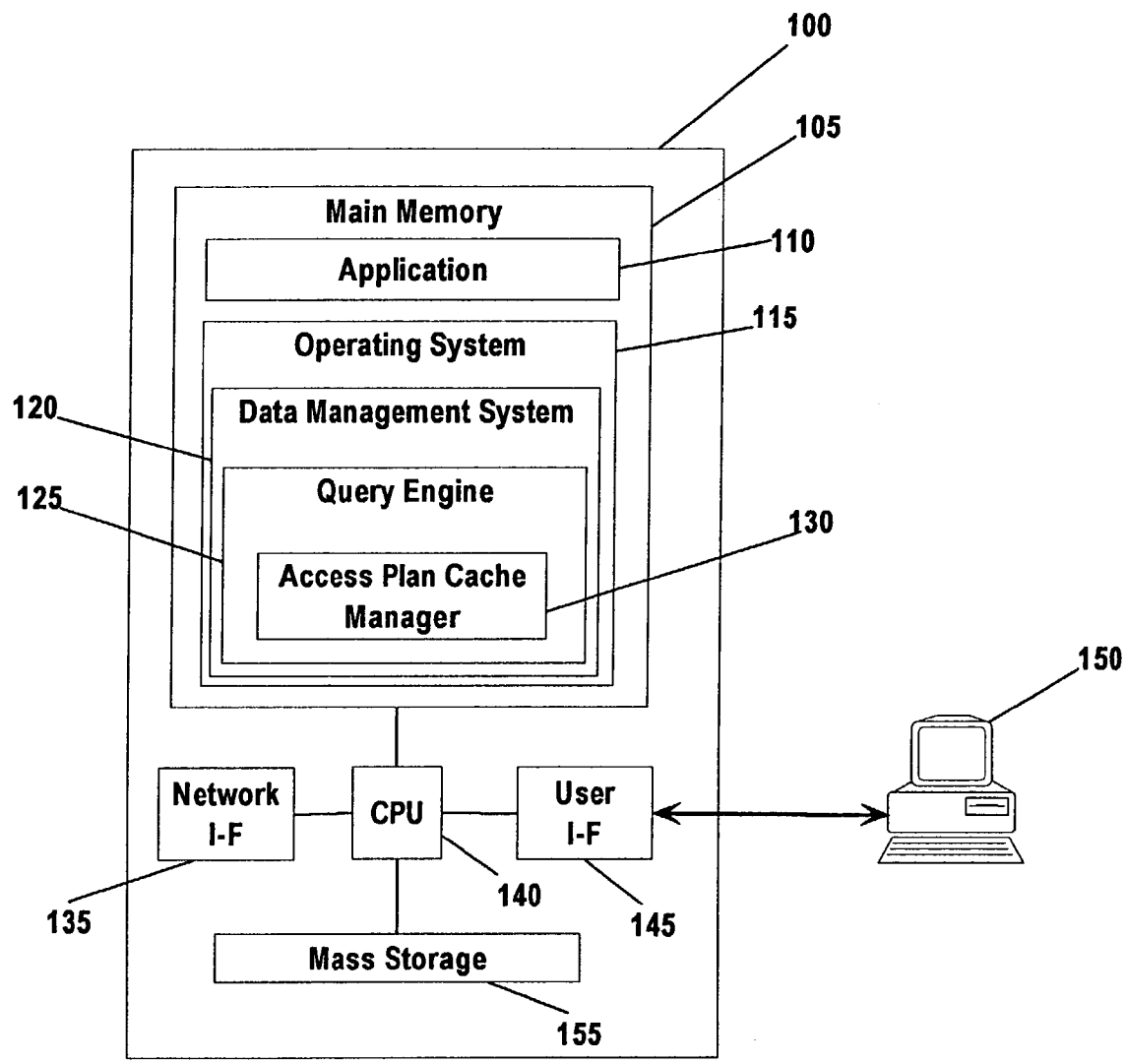
FIG. 1 is a block diagram showing the computer system used in the preferred embodiment of the present invention.

Turning now to the drawings, FIG. 1 shows some of the operational components used in the computer system of the preferred embodiment of the present invention. Computer system 100 is an enhanced IBM iSeries computer system, although other computer systems could be used. Depicted components include central processing unit (CPU) 140, network interface 135, user interface 145, mass storage 155, and main memory 105. CPU 140 is used to execute the programs stored in main memory 105, although it should be understood that at certain times these programs may partially or completely reside in mass storage 155. It should further be understood that the term memory, as used herein, encompasses main memory 105 and/or mass storage 155. Network interface 135 is used to communicate with other computer systems. User interface 145 is used to accept commands and relay information to the one or more users of computer system 100.

Figure 2:
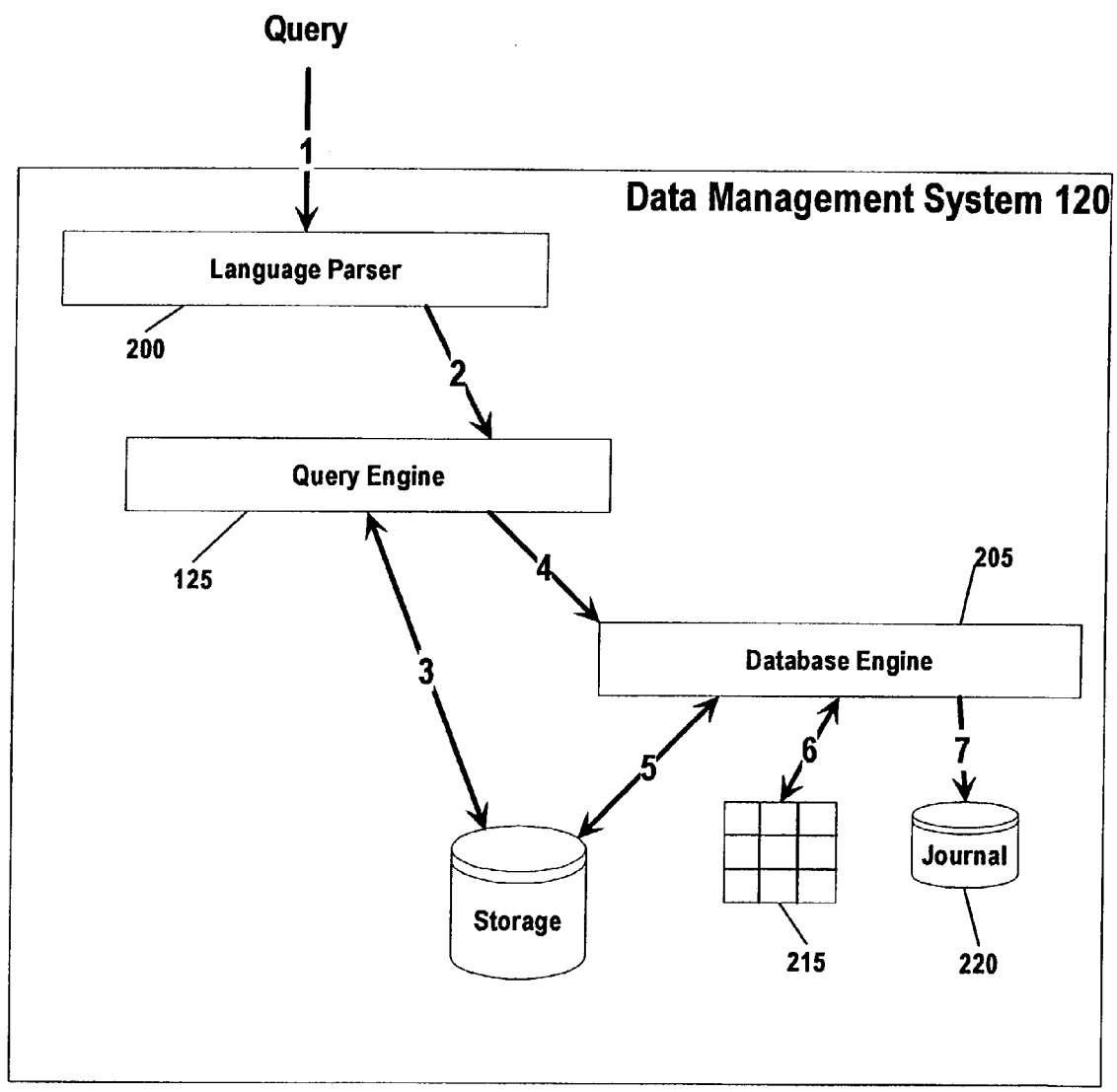
FIG. 2 is a block diagram showing the Data Management Systems used in the preferred embodiment of the present invention.
Figure 3:
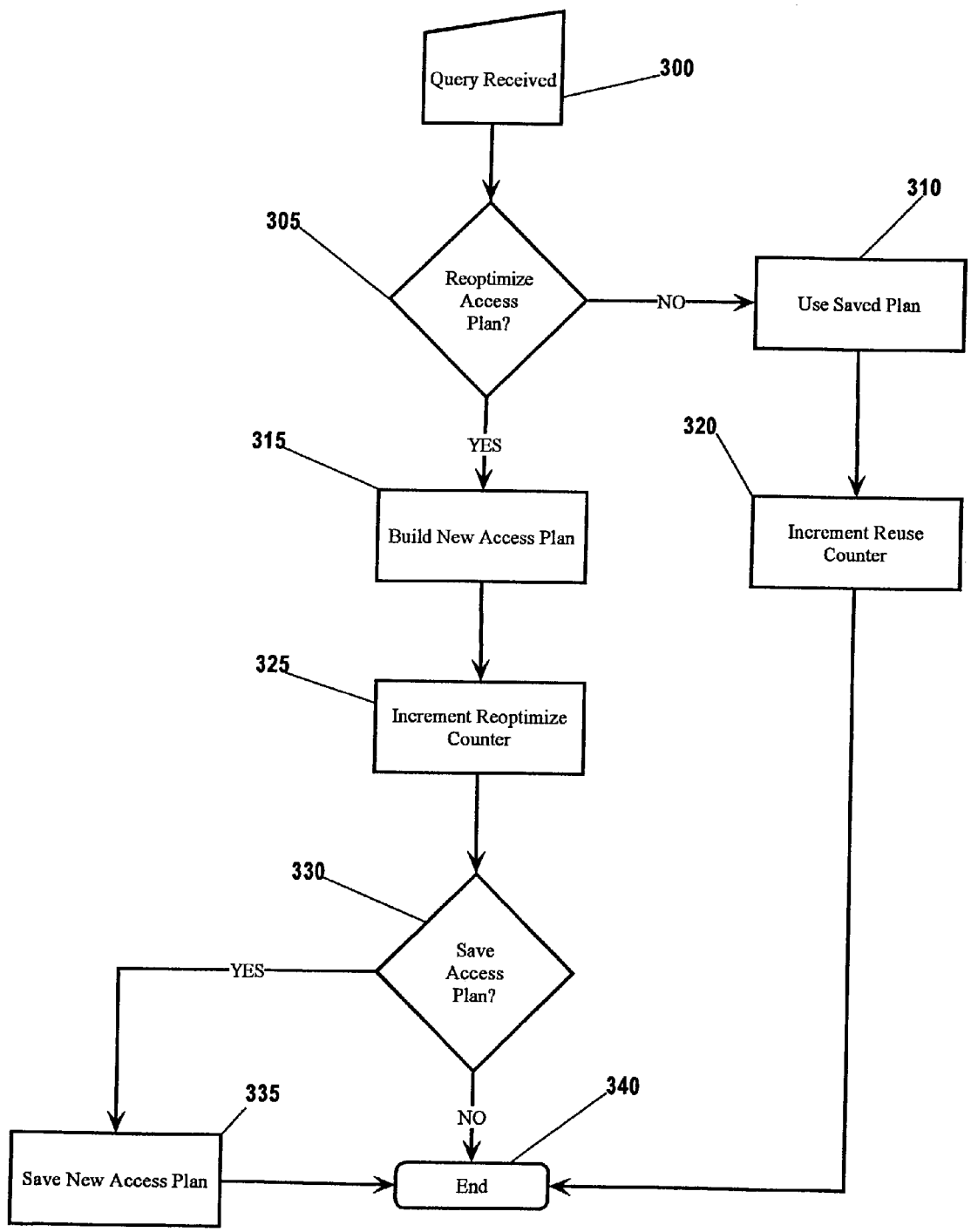
FIG. 3 is a flow diagram showing the steps used to carry out highlighted processing of the Access Plan Cache Manager of the preferred embodiment.

Operating system 115 contains Data Management System (DMS) 120. DMS 120, which is described in forthcoming paragraphs and with reference to FIGS. 2 and 3, is integrated into operating system 115, although non-integrated operating systems could be used in the alternative. DMS 120 is further shown to include Query Engine 125. Query Engine 125, which is discussed in more detail in the text associated with FIG. 2, is further shown to contain Access Plan Cache Manager (APCM) 130. APCM 130 is the entity of the preferred embodiment that is responsible for determining which access plans should be retained and which access plans should be discarded. It should be noted that while APCM 130 is shown on FIG. 1 as a monolithic entity, its function may well be spread amongst several programmic entities.

Application 110 is an example application program that may be used to access data controlled by DMS 120.

As a preliminary matter, it should be understood that while the embodiments of the present invention are being described herein in the context of a complete system, certain program mechanisms, such as APCM 130, are capable of being distributed in program product form. Of course, a program product can be distributed using different types of signal bearing media, including, but not limited to: recordable-type media such as floppy disks and CD ROMs; and transmission-type media such as digital and analog communications links.

FIG. 2 is a block diagram showing some of the internal components of DMS 120 of the preferred embodiment. As an overview, Language Parser 200 is responsible for breaking queries down into known pieces. Different actions are then taken based upon what pieces are identified. Control is then passed to Query Engine 125, which determines whether a stored access plan should be utilized or whether a new access plan should be created. Either way, the access plan is passed to Database Engine 205, which executes the query against stored data to generate results for the user (Table 215). Appropriate entries may be logged in Journal 220.

FIG. 3 is a flow diagram showing the steps used to carry out highlighted processing of APCM 130 of the preferred embodiment. Receipt of a query is shown in block 300. APCM 130 then determines whether a new access plan is necessary (i.e., whether the internal steps should be reoptimized) [block 305]. In the preferred embodiment, reoptimization is considered when data skew is detected. Those skilled in the art, though, will appreciate that other, data-specific considerations are possible. For example, the overall size of the table could be used as a data-specific consideration. (Thus, a data-specific consideration, as used herein is consideration that is made based on the make-up of the data that is the subject of the query.) In the preferred embodiment, data skew is detected by probing an index to get an estimate of the number of rows that will be selected by the query. This estimate is then compared to a previous estimate stored in the saved access plan. If the estimates vary greatly, data skew has been detected.

If APCM 130 determines that reoptimization is not necessary, APCM 130 passes the stored access plan to Database Engine 205 [block 310], increments a counter indicating that the stored plan for this query was reused [block 320], and terminates execution in block 340. If APCM 130 determines that reoptimization is indeed necessary in block 305, APCM 130 builds a new access plan and passes it to Database Engine 205 [block 315]. APCM 130 then increments a counter indicating that reoptimization was necessary for the particular query and then determines whether the new access plan should be stored [block 330]. In the preferred embodiment, this determination is made by considering the reoptimize counter vis-à-vis the reuse counter. If, based on history, a saved access plan cannot be used at least seventy-five percent of the time, the new access plan is saved. Thus, if the currently saved access plan appears retain to its value, APCM 130 terminates processing in block 340. However, if APCM 130 of the preferred embodiment determines that the saved access plan should be discarded, the new access plan is saved in block 335 before terminating processing in block 340. It should be appreciated, then, that the preferred embodiment of the present invention permits the retention of historically good access plans while nevertheless allowing for the use of special case access plans when data skew is detected.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. An apparatus, said apparatus comprising:
   a processor;
   memory; and
   a database system, said database system residing in said memory, said database system creating a first access plan for a query, saving said first access plan, and using said first access plan for executing said query at least once, said database system subsequently creating a second access plan for said query upon encountering a data-specific consideration and using said second access plan for executing said query at least once, said database system selectively retaining said first access plan as a saved access plan for said query after encountering said data-specific consideration despite creating said second access plan for said query;
   wherein upon each receipt of said query said database system determines a value of said first access plan and retains said first access plan when dictated by said value determination and wherein said database system discards said first access plan and retains said second access plan when dictated by said value determination.

2. The apparatus of claim 1 wherein said value determination is a ratio involving how often said first access plan is reused and how often said second access plan is created.

3. The apparatus of claim 1 wherein said data-specific consideration is data skew.

4. A program product, said program product comprising:
   computer-readable storage media; and
   a database system disposed on said computer-readable storage media, said database system residing in said memory, said database system creating a first access plan for a query, saving said first access plan, and using said first access plan for executing said query at least once, said database system subsequently creating a second access plan for said query upon encountering a data-specific consideration and using said second access plan for executing said query at least once, said database system selectively retaining said first access plan as a saved access plan for said query after encountering said data-specific consideration despite creating said second access plan for said query;
   wherein upon each receipt of said query said database system determines a value of said first access plan and retains said first access plan when dictated by said value determination and wherein said database system discards said first access plan and retains said second access plan when dictated by said value determination.

5. The program product of claim 4 wherein said value determination is a ratio involving how often said first access plan is reused and how often said second access plan is created.

6. The program product of claim 4 wherein said data-specific consideration is data skew.

7. A computer-implemented method, said method comprising the steps of:
   creating a first access plan for a query, saving said first access plan, and using said first access plan for executing said query at least once;
   determining a value of said first access plan upon each receipt of said query;

subsequent to said steps of creating, saving and using said first access plan, creating a second access plan for said query upon encountering a data-specific consideration and using said second access plan for executing said query at least once;

selectively determining whether to retain said first access plan as a saved access plan for said query after encountering said data-specific consideration, said selectively determining step determining to retain said first access plan when dictated by said value determination;

responsive to said selectively determining step determining to retain said first access plan, retaining said first access plan as a saved access plan for said query despite creating said second access plan for said query; and discarding said first access plan and retaining said second access plan when dictated by said value determination.

8. The computer-implemented method of claim 7 wherein said value determination is a ratio involving how often said first access plan is reused and how often said second access plan is created.

9. The computer-implemented method of claim 7 wherein said data-specific consideration is data skew.

* * * * *